July 4, 1961

C. HADDAD 2,990,841

AUTOMATIC MOISTURE EXPULSION VALVE

Filed Nov. 19, 1956

C. HADDAD
INVENTOR.

BY E.C. McRae
J.R. Faulkner
J.H. Oster

ATTORNEYS

United States Patent Office 2,990,841  
Patented July 4, 1961

2,990,841
AUTOMATIC MOISTURE EXPULSION VALVE
Charles Haddad, Detroit, Mich., assignor to Ford Motor Company, Dearborn, Michigan, a corporation of Delaware
Filed Nov. 19, 1956, Ser. No. 623,150
3 Claims. (Cl. 137—178)

This invention pertains to a moisture expulsion valve and more particularly to a valve which expells at a predetermined pressure the accumulation of condensate in an air bag suspension system. An air bag suspension system generally includes a compressor, an accumulator or reserve tank, a plurality of leveling valves and the independent air bags. The accumulation of condensation particularly noticeable in the accumulator tank is harmful to this system with respect to rust and corrosion. An object of this invention, therefore, is to provide an automatic moisture expulsion valve for an air suspension system.

A further object is to provide a moisture expulsion valve which will remove air bag suspension system condensate collected in the accumulator tank.

Still a further object is to provide an automatic moisture expulsion valve which will automatically remove the condensate without excessive venting of air from the system.

Still a further object is to provide a moisture removal valve which will automatically operate at predetermined air pressures in the accumulator tank. Other objects and advantages will become more apparent when considered in connection with the accompanying drawings wherein.

Figure 1:
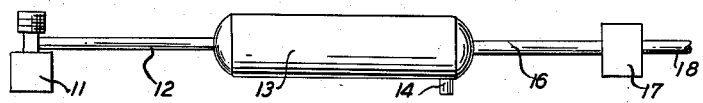
FIGURE 1 is a partial schematic view of a part of an air bag suspension system and showing the general position of the water expulsion valve.

Referring now to the drawings, an air compressor 11 is shown which may be driven by a number of available power sources such as the engine, the engine fan belt, and/or the battery. An air pipe 12 connects the compressor 11 to an accumulator tank 13 which stores a predetermined amount of air under varying pressures. The accumulator tank 13 is essentially a reserve tank from which is drawn amounts of air required by the individual leveling bags (not shown) in performing their raising operation. The applicant's novel moisture expulsion valve 14 is located in the lowest part of the system so that moisture collected in the system will drain toward it and be expelled into the atmosphere. A second air pipe 16 connects the accumulator tank to a leveling cut off valve 17 which in turn distributes air to the individual leveling bags (not shown) that control the bag heights through conduit 18 shown in part.

Referring now to the drawing, it can be seen that the accumulator tank 13 is formed so that its sides 19 converge to a lowermost point to which is secured a generally radial internally threaded boss 21. The valve 14 comprises an exteriorly threaded inverted cuplike housing 22 threadably connected to the boss 21 and having a cylindrical cavity 23 therein. The closed end 24 of the housing 22 has a pair of drilled valve apertures 26 and 27. Cavity 23 is closed by a valve support 28 which is secured within the housing 22 by rolling the edge 29 inwardly and securing the support 28 against shoulder 31 formed in the housing. A drain hole 32 in the support 28 is axially aligned with the aperture 26 and has an annular raised boss 33 around it. Slidably positioned in the aperture 26 and extending into the cavity 23 is a pressure responsive exhaust valve generally indicated at 34. Valve 34 is generally cylindrical in configuration and is provided with a piston type head 36 having in it an annular groove 38 with a resilient O type sealing ring 39 made from a natural or synthetic elastomer. The piston head 36 is separated from the cylinder 37 by an annular flange 41. The flange 41 is arranged so that it will bottom against the underside of the closed end 24 when the piston head 36 is flush with the top of the closed end. A coiled spring 42 bottoms on the underside of the annular flange 41 and the support 28 and urges the valve 34 upwardly. The lower portion of the valve body 37 has an inverted truncated cone like projection 43 to which is bonded a resilient bumper 44 made from a natural or synthetic elastomer. In axial alignment with the aperture 27 in the closed end 24 is a vertically upwardly extending guide pin 46 mounted on a raised base 47 integral with the support 28. A drain valve 48 is axially aligned with the aperture 27 and is provided at its upper end with an inverted truncated cone-like projection 49 about which is molded resilient bumper 51 of natural or synthetic elastomer. The bumper 51 contacts a depending annular boss 52 surrounding the aperture 27. Valve 48 has a radially outwardly extending integral flange 53 and a depending cylindrical body 54 having a hollowed interior 56. Guide pin 46 extends into the hollowed interior 56 of the valve 48 so that the valve will slidably rise or fall on the same vertical axis. A spring 57 completes the installation and is positioned about the annular base 47 and the flange 53 urging the valve 48 to bottom against the boss 52.

Although valve holes 26 and 27 are shown as having different diameters, these holes may be of the same diameter. The important difference between the valves is that the spring 42 must exert a lesser force than spring 57 which thus allows the valve 37 to bottom against the annular boss 33 before the valve 48 is moved downwardly.

Figure 2:
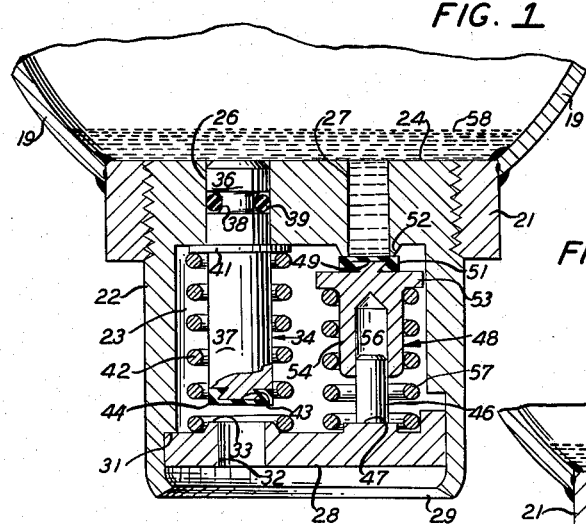
FIGURE 2 is an enlarged cross sectional view of one embodiment of the applicant's invention.
Figure 3:
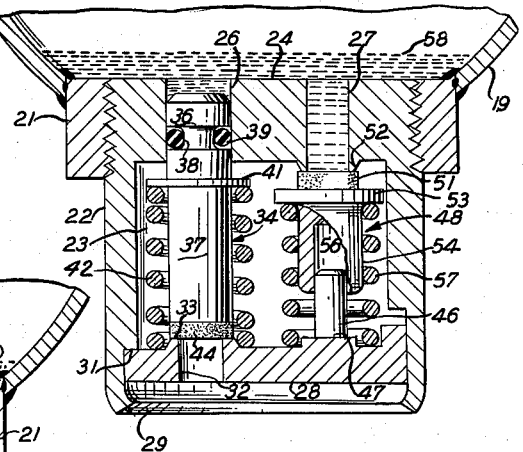
FIGURES 3 and 4 are similar to FIGURE 2 and illustrate changes in valve positions.
Figure 4:
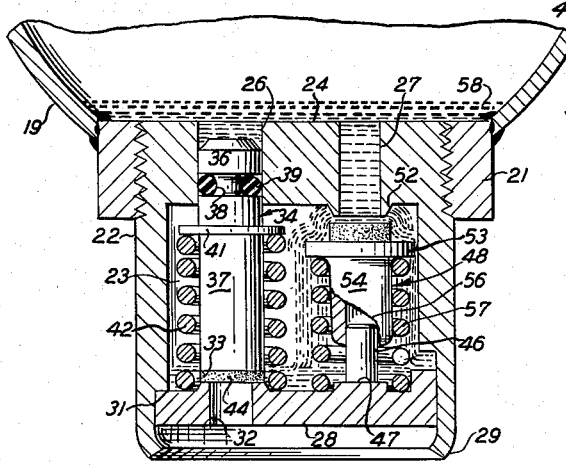

As can be seen in FIGURE 2 condensate indicated at 58 has formed in the accumulator tank 13 and is in the vicinity of the valve 14. Because the spring 42 exerts a lesser force than spring 57, when the increase in pressure in the central tank reaches a predetermined pressure spring 42 is overcome and valve 34 is forced downwardly until it bottoms on the boss 33, as shown in FIGURE 3, shutting off the drain hole 32 to atmosphere. Continued increase in the tank pressure results in the valve 48 sliding downwardly and cracking open a space between the bumper 51 and the boss 52 permitting condensate 58 mixed with a small amount of pressurized air to be expelled into the cavity 23 as shown in FIGURE 4.

When tank air pressure decreases as a result of air being required by the leveling valves, spring 57 overcomes the air pressure in the tank and maintains the valve 48 securely against the boss 52. A continued predetermined decrease in pressure will then result in the spring 42 overcoming the pressure in the tank and urging the valve 34 upwardly to bottom against the underside of the closed end 24 thus opening the drain hole 32 and permitting the condensate 58 to be exhausted from the cavity 23.

It will be understood that the invention is not to be limited to the exact construction shown and described, but that various changes and modifications may be made without departing from the spirit and scope of the invention, as defined in the appended claims.

What is claimed is:

1. A pressure responsive valve for automatically purging a pressurized vessel of moisture comprising in combination, a valve body adapted to be mounted upon the lower portion of a vessel and defining a moisture receiving cavity, first and second apertures in one end of said valve body, a drain hole through the opposite end of said valve body axially aligned with said first aperture, a pressure responsive intake valve slidably mounted in said valve body for closing said second aperture, an intake valve spring biasing said intake valve toward closed position, a pressure responsive exhaust valve adapted to close said drain hole and having a piston slidably mounted in said first aperture, and an exhaust valve spring having a spring rate less than the spring rate of said intake valve spring biasing said exhaust valve toward open position to uncover said drain hole.

2. A pressure responsive valve for automatically purging a pressurized vessel of moisture comprising in combination; a cup-like valve body defining a moisture receiving cavity, first and second apertures in the closed end of said body, a support secured to the other end of the body closing the cavity, a drain hole in the support axially aligned with said first aperture, a raised boss on the support axially aligned with the second aperture, a guide pin centrally located in the boss and extending axially towards the second aperture, a pressure responsive intake valve slidably mounted on said guide pin for closing said second aperture, said valve having a radially outwardly extending flange, an intake valve spring interposed between said flange and said support and having one end closely surrounding said boss for biasing said intake valve closed, a pressure responsive exhaust valve adapted to close said drain hole and having a piston slidably mounted in said first aperture, a radially outwardly extending flange on said exhaust valve disposed intermediate the ends thereof, an exhaust valve spring having a spring rate less than the spring rate of the intake valve spring interposed between said second named flange and said support biasing said exhaust valve to open position to uncover said drain hole.

3. A pressure responsive valve for automatically purging a pressurized vessel of varying air pressures of moisture comprising in combination a cup-like valve body adapted to be threadably secured to a pressurized vessel with its closed end adjacent the vessel's interior and defining a moisture receiving cavity, first and second apertures in the closed end of said body, a support secured to the other end of the body closing the cavity, a drain hole in the support and axially aligned with said first aperture, a raised boss on the support axially aligned with the second aperture, a guide pin centrally located on the boss and extending axially toward the second aperture, a pressure responsive intake valve slidably mounted on said guide pin, said valve having a radially outwardly extending flange and a molded resilient seal, an intake valve spring interposed between said flange and around said boss urging said resilient seal to overlay the second aperture, a pressure responsive exhaust valve having a piston slidably mounted in said first aperture and a resilient seal engaging the sides of said first aperture, a radially outwardly extending flange on said exhaust valve disposed axially away from said second mentioned resilient seal and adapted to engage the underside of the closed end of the valve body, a resilient seal attached to the opposite end of said exhaust valve and adapted to overlay the drain hole in the support member and an exhaust valve spring having a spring rate less than the spring rate of the intake valve spring interposed between said second named flange and said support normally urging the exhaust valve axially inwardly to uncover said drain hole.

References Cited in the file of this patent

UNITED STATES PATENTS

| | | |
|---|---|---|
| 1,907,299 | Kudolla | May 2, 1933 |
| 2,418,440 | White et al. | Apr. 1, 1947 |
| 2,548,236 | Parks | Apr. 10, 1951 |
| 2,619,106 | Wilkerson | Nov. 25, 1952 |
| 2,825,425 | Jacovelli | Mar. 4, 1958 |
| 2,845,081 | George | July 29, 1958 |